United States Patent [19]

Sharon

[11] Patent Number: 5,273,240
[45] Date of Patent: Dec. 28, 1993

[54] IMPACT ABSORPTION SYSTEM, PARTICULARLY FOR AIRCRAFT SEATS

[76] Inventor: Baruch Sharon, 16 Rehavat Ilan St., Givat Shmuel 51905, Israel

[21] Appl. No.: 876,366

[22] Filed: Apr. 30, 1992

[30] Foreign Application Priority Data

May 2, 1991 [IL] Israel ..................... 098041

[51] Int. Cl.⁵ ............... B64D 25/04; B60G 13/18; B60N 2/42; F16F 7/12
[52] U.S. Cl. ............... 244/122 R; 188/271; 188/280; 188/374; 188/377; 267/64.12; 267/205; 297/216.17
[58] Field of Search ............ 244/118.6, 122 R; 188/374, 377, 280, 282, 271, 275; 267/226, 224, 214, 196, 205, 64.12; 297/216

[56] References Cited

U.S. PATENT DOCUMENTS

| | | | |
|---|---|---|---|
| 2,682,931 | 7/1954 | Young | 297/216 |
| 3,038,560 | 6/1962 | Long, Jr. | 188/280 |
| 3,111,201 | 11/1963 | Bliven et al. | 267/226 |
| 3,524,678 | 8/1970 | DeLavenne | 297/216 |
| 3,697,128 | 10/1972 | Strein et al. | 297/216 |
| 3,717,224 | 2/1973 | Leach et al. | 188/374 |
| 3,820,634 | 6/1974 | Poe | 188/374 |
| 3,913,707 | 10/1975 | Wastenson et al. | 188/374 |
| 4,458,887 | 7/1984 | Shimokura et al. | 267/64.12 |
| 4,474,271 | 10/1984 | Mölders et al. | 188/280 |
| 4,523,730 | 6/1985 | Martin | 244/122 R |
| 5,085,300 | 2/1992 | Kato et al. | 188/282 |
| 5,174,421 | 12/1992 | Rink et al. | 188/374 |

FOREIGN PATENT DOCUMENTS

WO91/06786 5/1991 PCT Int'l Appl. ............. 188/374
1446383 12/1988 U.S.S.R. ............. 267/205

Primary Examiner—Michael S. Huppert
Assistant Examiner—Virna Lissi Ansley
Attorney, Agent, or Firm—Ostrolenk, Faber, Gerb & Soffen

[57] ABSTRACT

An impact energy absorption system for aircraft seats and the like, comprising seat mounting means, a seat movable between a first unloaded position and a second crash induced position, a deforming die and an additional set of die jaws connected to the seat mounting and defining an aperture of variable size, and a deformable rod having a shoulder connecting the seat to the mounting the rod passing through the deforming die and the variable die jaws. During crash induced movement of the seat between its two positions the rod is pulled through the deforming die and the die jaws to absorb impact energy by deformation of the rod. The aperture defined by the die jaws is variable being adapted to allow for self adjustment of the aperture size and respective impact energy absorbing capacity corespondent to the weight of the seat occupant. Restricting means are provided to prevent variation of the aperture size when the external accelarative forces characteristic of pre crash maneuvering or of crash impact are experienced.

6 Claims, 8 Drawing Sheets

IMPACT ABSORPTION SYSTEM, PARTICULARLY FOR AIRCRAFT SEATS

FIELD OF THE INVENTION

The present invention relates generally to aviational safety devices, and more particularly to seat mounting systems adapted to reduce injury to passengers in the event of air crash.

BACKGROUND OF THE INVENTION

Safety systems for aircraft passenger or crew seats have been devised. See for example U.S. Pat. No. 4,523,730.

Generally such systems are characterized by a seat slidably mounted with respect to the floor of the aircraft. The sliding movement of the seat is restricted by the provision of a deformable rod or pipe. Energy absorption in a crash situation is accomplished by die means adapted to squeezably deform the rod or pipe as the crash seat descends under the extreme load experienced in a crash.

One of the major deficiencies experienced in this type of aircraft crash seat resides in that while the kinetic crash energy developed increases proportionately to the weight of the seat occupant, the energy absorption capacity of seat safety system is essentially constant and not readily adjustable. Thus a relatively heavy occupant will exceed the energy absorbing capacity of the seat system and remain unprotected towards the end of the sliding movement thereof, whereas relatively lightweight passengers will not optimally exploit the energy absorbing capability of the system along the entire stroke of the seat between its normal and crash induced positions.

To remedy this deficiency, certain improvements have been devised involving manual adjustment of the system for optimalization correspondent to the individual conditions under which it is to be operable. According to such conventional systems, at some time prior to crash, generally before take-off, the occupant must manually adjust the system in order to adapt it to his weight.

Obviously, such adjustments are inconvenient and cumbersome, and are particularly inapplicable to multi-passenger seats used in normal air passenger traffic.

Additionally, it is known that in many crash situations, prior to impact, aircraft take evasive action including braking and attempts to pull out of the crash. Such maneuvering results in the application of various accelerative forces to the aircraft affecting the relative weight of the seat occupant, and possibly impacting on the occupant weight induced self optimization of the system.

Thus it is the general object of the invention to provide an impact energy absorption system for aircraft seats being self-adjusting with respect to the individual conditions, namely the weight of the occupant or occupants of the seat.

It is a further object of the invention to effect impact energy absorption by incorporation of variable rod deforming means in addition to the initial, conventional die means.

It is a still further object of the invention to provide inertia responsive means to isolate the weight induced self adjustment of impact energy absorption capacity from the effects of accelerative forces expereienced during pre-crash maneuvering.

SUMMARY OF THE INVENTION

According to the invention there is thus provided an impact energy absorption system particularly for aircraft seats. The system comprises mounting means for the seat including at least one substantially upright support to which the seat is coupled for movement therealong between a first, unloaded position and a second, crash-induced position, a deformable rod having a first contoured section and a second contoured section, defining a shoulder, abutting against a deforming die. The second section passes through the die and is coupled to the seat such that movement of the seat is restrained by the said first section against the die. Upon the said first section being forcibly pulled through said die, the first section is deformed. The system further comprises variable die-jaw means surrounding the said second section defining an aperture closeable in the direction of the rod by an amount proportional to the weight of an occupant of the seat to thereby cause a further deformation of the said first section by the jaw means during the first section further being pulled through the jaw means towards the second position of the seat.

The variable die-jaws are seated within a convergent cavity held in a fixed position relative to the seat support. The cavity is formed within a housing comprised of telescopically coupled members, a first member of the housing supporting the convergent cavity in the said fixed position, and a second member thereof moveable with respect to the first member and adapted to displace the die-jaws within the said cavity corresponding to the position of the second member relative to the first member. Restricting means are provided to block relative movement of the said housing members one to the other during periods of external acceleration or deceleration, while allowing moderate relative movement thereof under the weight of the occupant during periods absent said external acceleration or deceleration.

The restricting means may comprise a sealed fluid filled hydraulic cylinder associated with the housing members. The cylinder is bisected by a plunger and valve control means are provided to control passage of hydraulic fluid within the cylinder from one side of the plunger to the other.

The valve control means comprise an inertia responsive valve member passed through the plunger, the valve member being normally held in a neutral equilibrium suspended position by the urge of oppositely directed spring means. Sealable passage means are formed between opposite sides of the plunger, the sealing of which effected by movement of the valve member away from its suspended equilibrium position, occurring during periods of external acceleration or deceleration. The valve member may be weighted to increase its mass and inertia responsiveness.

BRIEF DESCRIPTION OF THE DRAWINGS

The invention will be more clearly understood in light of the following description, given by way of example only, of a preferred embodiment thereof, in conjunction with the accompanying drawings, wherein.

DETAILED DESCRIPTION OF THE PREFERRED EMBODIMENT

Figure 1:
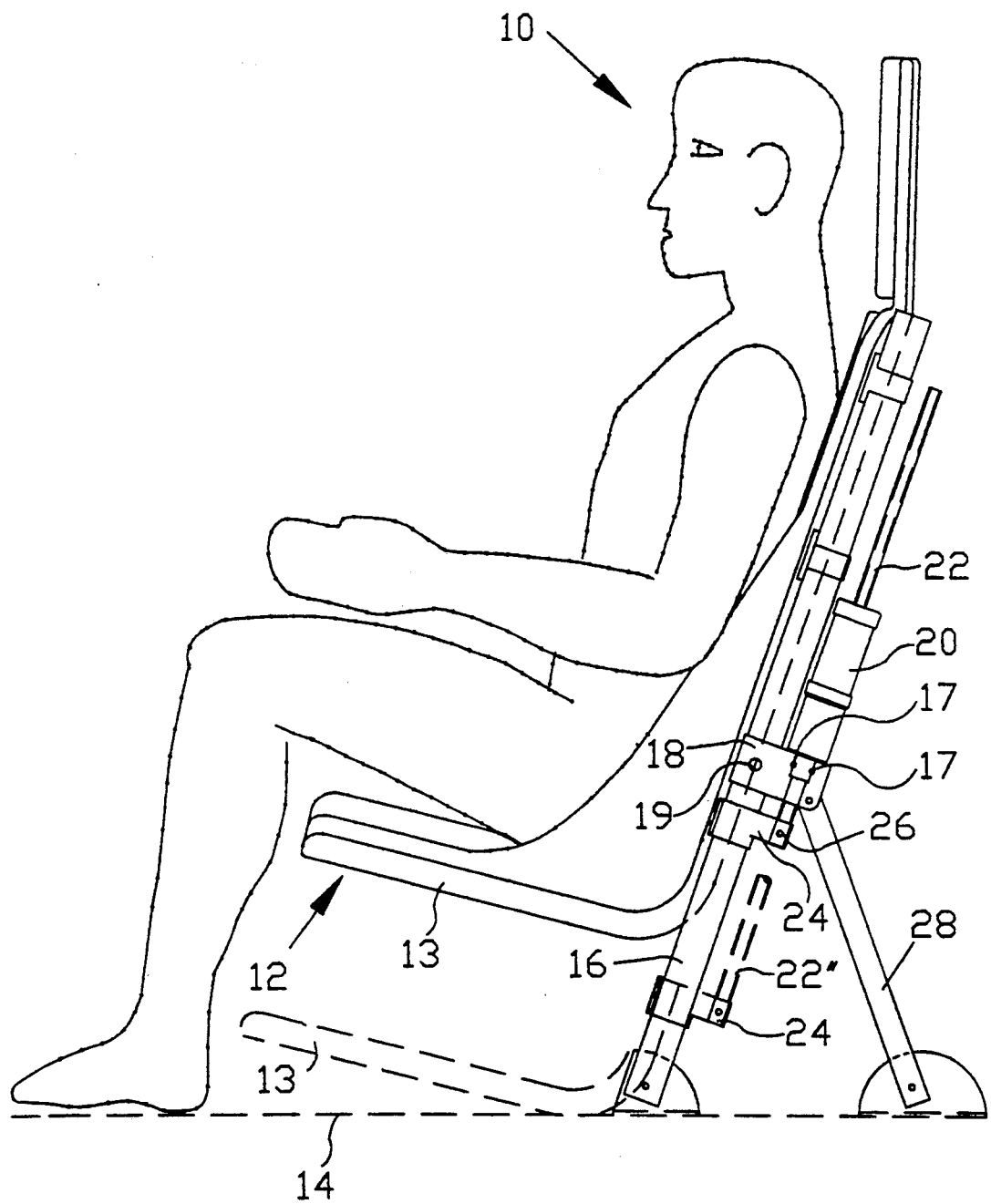
FIG. 1 is a schematic side view of a floor mounted seat provided with the impact absorbing system provided according to the present invention.
Figure 2:
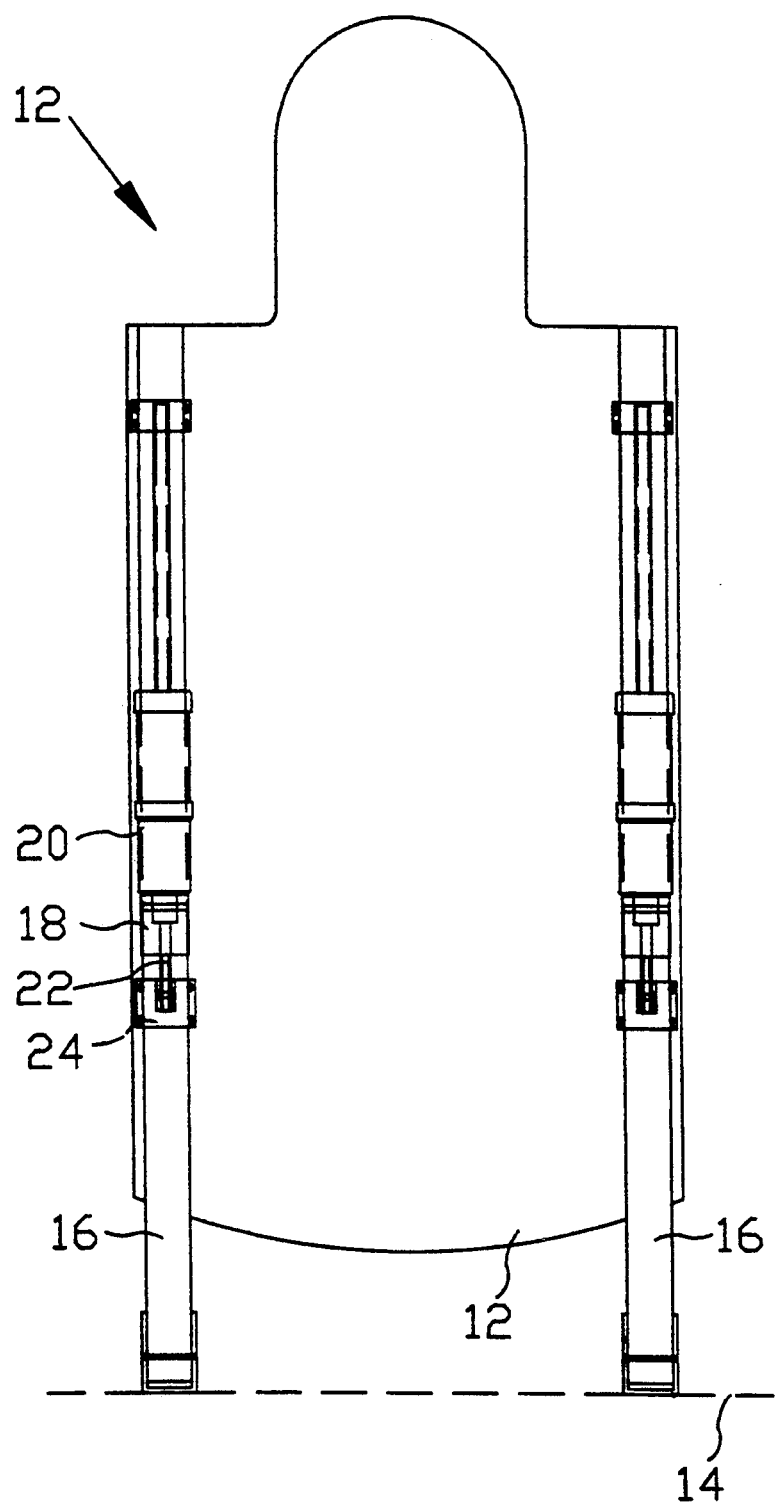
FIG. 2 is a rear view of the seat of FIG. 1.

As schematically shown in FIGS. 1 and 2, occupant 10 is seated on a seat, generally denoted 12, having a bucket 13 and mounted at the maximum allowable distance from the aircraft floor 14.

The mounting system of the seat 12 basically includes at least one, and in this example a pair, of posts 16 pivotally anchored to the floor 14. There is provided a first bracket 18 mounted on and affixed to the post 16 by bore and pin 19. A set of pins 17 are further provided in bracket 18 to support the system housing, generally denoted 20, in a manner to be described in detail further below. Deformable rod 22 passes through the housing 20 as shown in FIG. 3.

Seat 12 is connected to the mounting structure via a second bracket 24, being coupled at one side to the back of seat bucket 13 and on its other side, by pin 26 to the lower end of the deformable rod 22. A diagonal support 28 is connected to the bracket 18 to stabilize the seat mounting structure in the conventional manner.

Figure 3:
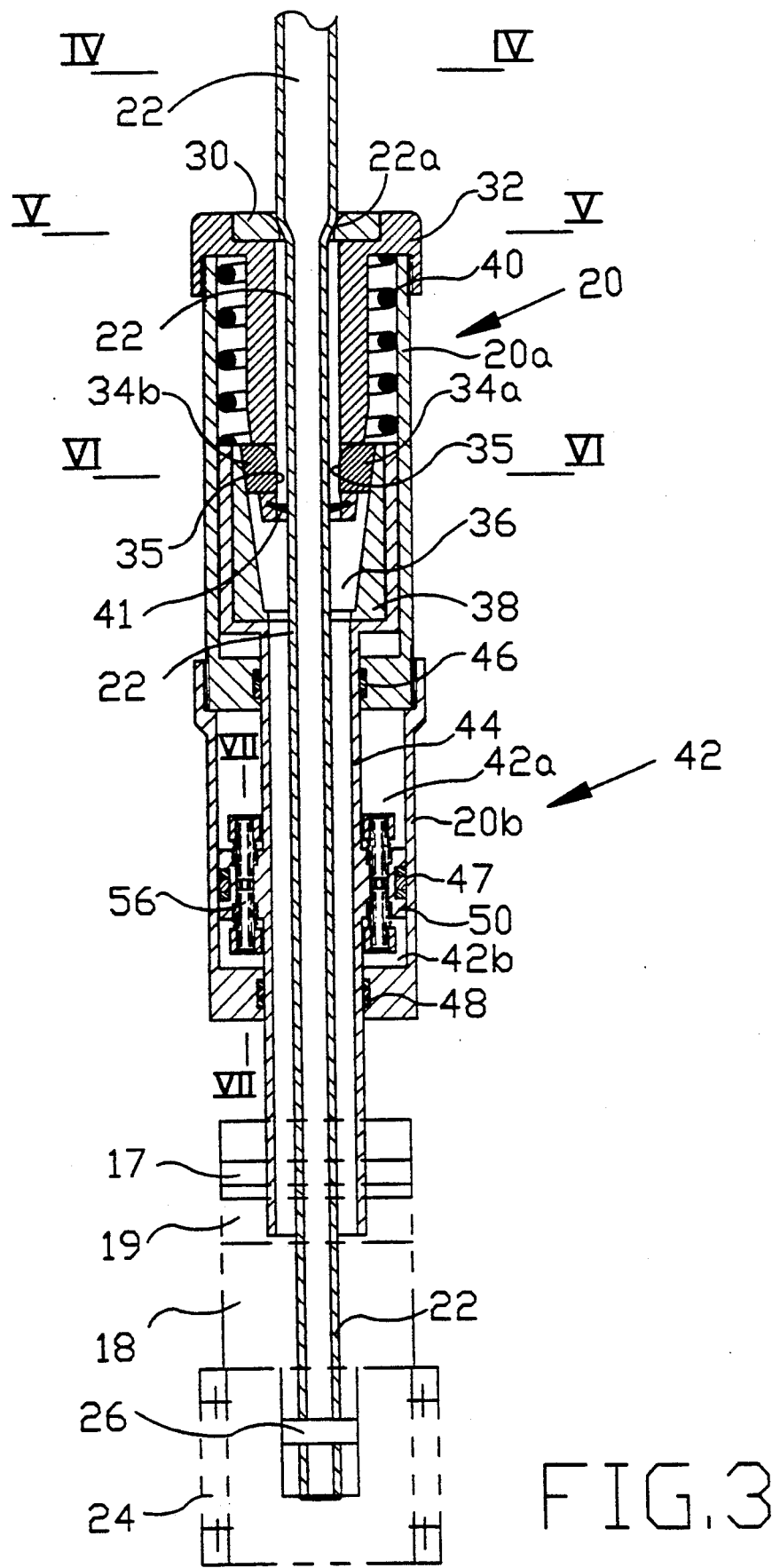
FIG. 3 is a cross-section of the operating parts of the system according to a preferred embodiment of the present invention in its inoperative or resting position.
Figure 4:
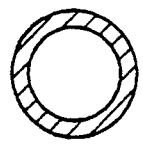
FIG. 4 is an enlarged scale cross-section taken along line IV—IV of FIG. 3.
Figure 5:
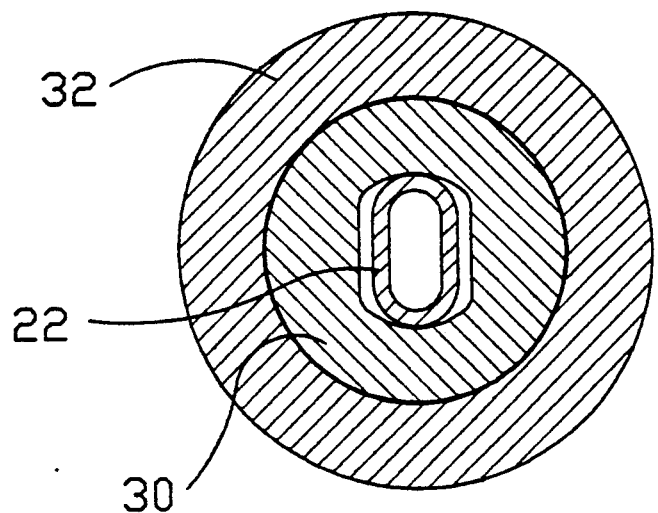
FIG. 5 is an enlarged scale cross-section taken along line V—V of FIG. 3.

Referring to FIG. 3 the impact absorption system proper will now be described. As shown, the deformable rod 22 passes through the housing 20 from one end down to the other, where it is connected to the second bracket 24. Rod 22 is of circular cross section having at its upper section projecting from the housing 20 a relatively large diameter as depicted in FIG. 4, converting into a somewhat smaller, generally rectangular cross section (Fig. 5) to form a shoulder 22a.

Figure 6:
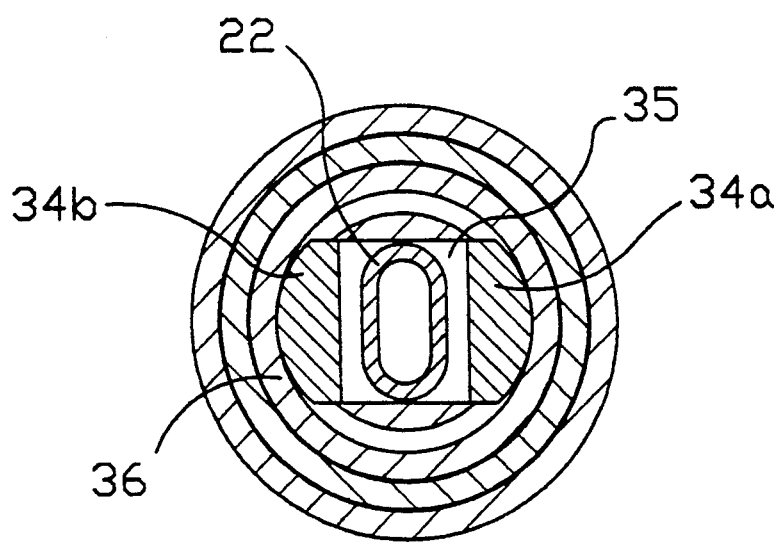
FIG. 6 is a cross-section taken along line VI—VI in FIG. 3.

As further seen in FIG. 3, for constructional reasons the housing 20 is made of two sections denoted 20a and 20b. At the top of the section 20a a cap member 32, is mounted, supporting the die ring 30, and two or more die jaws 34a and 34b (see Fig. 6), radially reciprocal in a horizontal plane. An aperture 35, defined between the die jaws is variable in accordance with the relative vertical location of jaws 34a and 34b within a convergent cavity 36 formed in a cup-like member 38. Thus, as die jaws 34 are downwardly displaced within cavity 36, the diameter of the aperture 35 becomes constricted—see FIG. 8.

As readily understood, the vertical displacement of the die jaws 34 within cavity 36 can only be caused by a sliding movement of the seat 12, transferred by the shoulder 22a.

Cap member 32 is urged upward within housing member 20a by a coil spring 40 interposed between the cap member 32 and cup member 38.

As will be further noted from FIG. 3, there is provided a sleeve member 44 passing within housing 20. Sleeve 44 is connected at its lower end to bracket 18 by pins 17 to form a stationary unit in fixed position relative to posts 16 and aircraft floor 14. The remaining parts and components of the housing assembly 20 are suspended over sleeve 44 and telescopically moveable with respect thereto as will be further described below.

Figure 8:
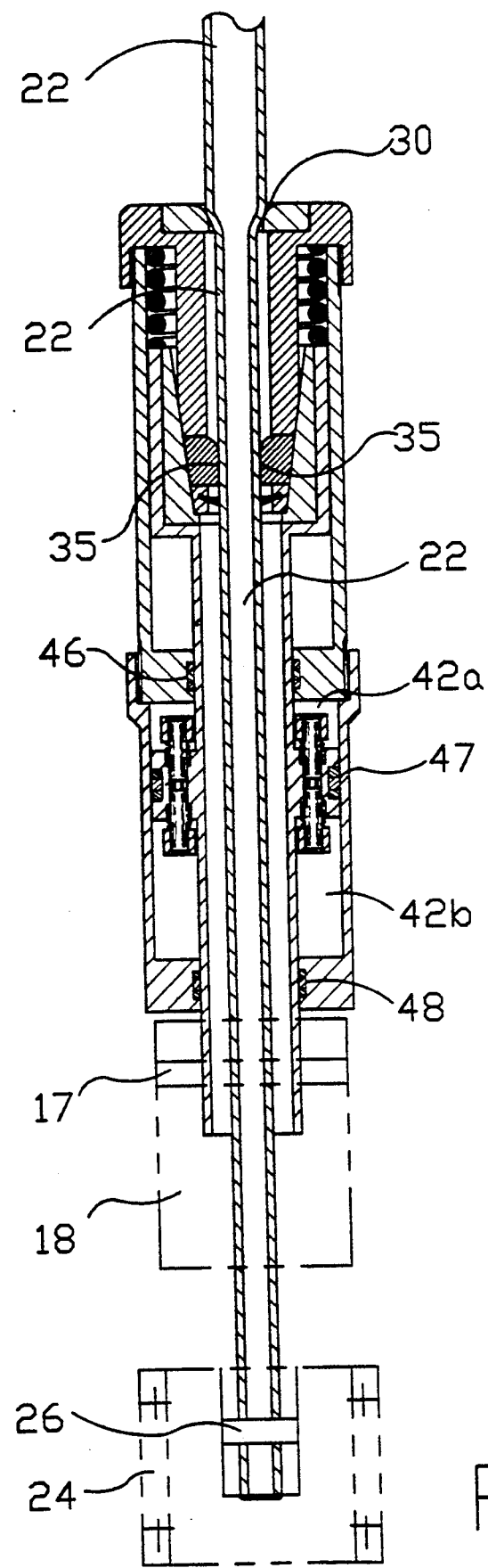
FIG. 8 is a section similar to FIG. 3 showing the system in a first, weight adjusted position.

Thus, as a passenger sits down in seat bucket 13, rod 22, being connected to the seat 12 by bracket 24, will be pulled down, such that shoulder 22a, in operational contact with die 30, will force cap member 32 to push jaws 34a and 34b down into the cavity 36, until an equilibrium position against the force of spring 40 is obtained. The strength of the spring 40 is designed so that only if an over-average weighing occupant (or occupants if more than one seat is mounted to the system) is seated, will the spring 40 become almost completely contracted (FIG. 8).

A conventional, one-way clamping spring ring 41 is provided to restrict vertical movement of deformable member 22, for instance from rebouncing after reaching its crash induced position.

The bottom portion 20b of the housing 20 together with the outer wall surface of the sleeve 44, serves as a hydraulic cylinder filled with hydraulic fluid. The cylinder is bisected by a plunger, generally noted 42, formed as an extension of sleeve 44, to define an upper chamber 42a and a lower chamber 42b. Gaskets suitably O-rings, denoted 46, 47 and 48, are provided between at the interface between sleeve 44 and housing sections 20a and 20b and around plunger 42, as illustrated, to prevent leakage of the hydraulic fluid as well as undesired seepage between upper and lower hydraulic chambers 42a and 42b.

Figure 7A:
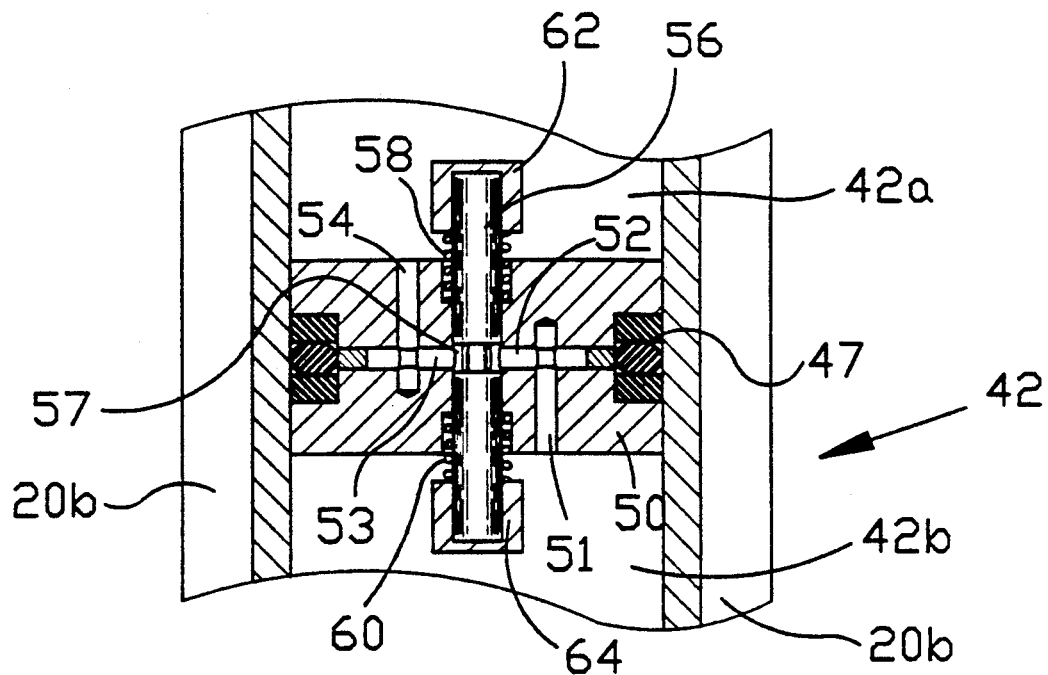
FIG. 7a is a section taken along line VII—VII in FIG. 3.
Figure 7B:
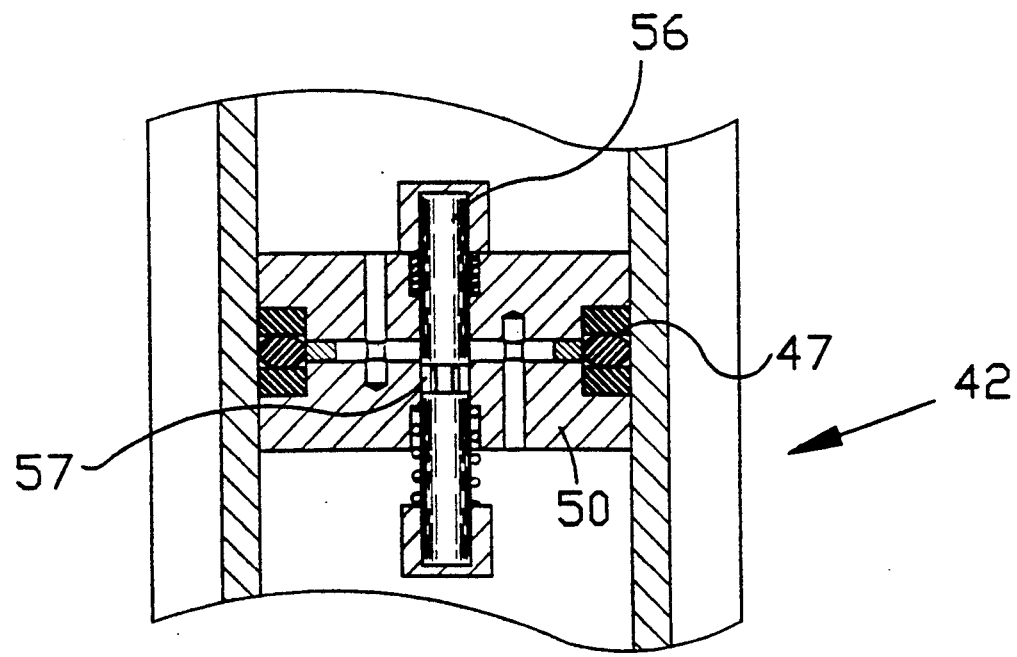
FIG. 7b illustrates the valve of FIG. 7a in a closed position.

As better seen in FIGS. 7a and 7b, the hydraulic plunger 42 formed in sleeve 44 comprises a plunger wall 50, relative to which the wall of bottom housing section 20b is telescopically moveable. Plunger wall 50 is provided with a through-going passage formed of sections 51, 52, 53 and 54 as illustrated. The flow of fluid between sections 52 and 53 is controlled by at least one (two being shown in the drawing) free floating pin-like valve member 56, with a circular recess 57, held in suspension by a pair of oppositely urged relatively weak springs 58 and 60. The valve pin 56 has at each side covers or caps 62 and 64 of adequate mass, to enhance the function of the valve as an inertia responsive element.

Thus in its equilibrium state, plunger 42 is open, valve member 56 being held in suspension by springs 58 and 60, and circular recess 57 being positioned between passages 52 and 53 to allow for the free flow of hydraulic fluid between the upper chamber 42a and the lower chamber 42b. The movement of the plunger—or more accurately the movement of the housing 20 relative to the plunger—is not impeded in such position of the valve member 56. However, as illustrated in FIG. 7b, in the event of aircraft acceleration or deceleration, for instance as experienced during impact evasive maneuvers prior to crash impact, or upon sudden impact of the aircraft, inertia valve member 56 will move upwards or downwards (downwards movement being shown) relative to plunger 42 against the force of spring 58 or 60 depending on the direction of accelerative force. As valve member moves out of its equilibrium position, recess 57 is offset from passages 52 and 53 to shut off the flow of fluid between chambers 42a and 42b, thereby preventing displacement of housing 20 relative to sleeve 44.

In summary, the design of housing 20 and sleeve 44 is such that when plunger is open, hydraulic fluid is able to freely move between upper chamber 42a and lower chamber 42b, and housing 20 is able to move relative to sleeve 44. However, when plunger 42 is in its closed position, the hydraulic fluid is not able to flow between chambers 42a and 42b, thereby locking the relative positions of housing 20 and sleeve 44 one to the other.

While a hydraulic impulse retarding arrangement has been shown, it will be readily appreciated that other arrangements may be applied such as one way centrifugal responsive clutch devices and the like.

Figure 9:
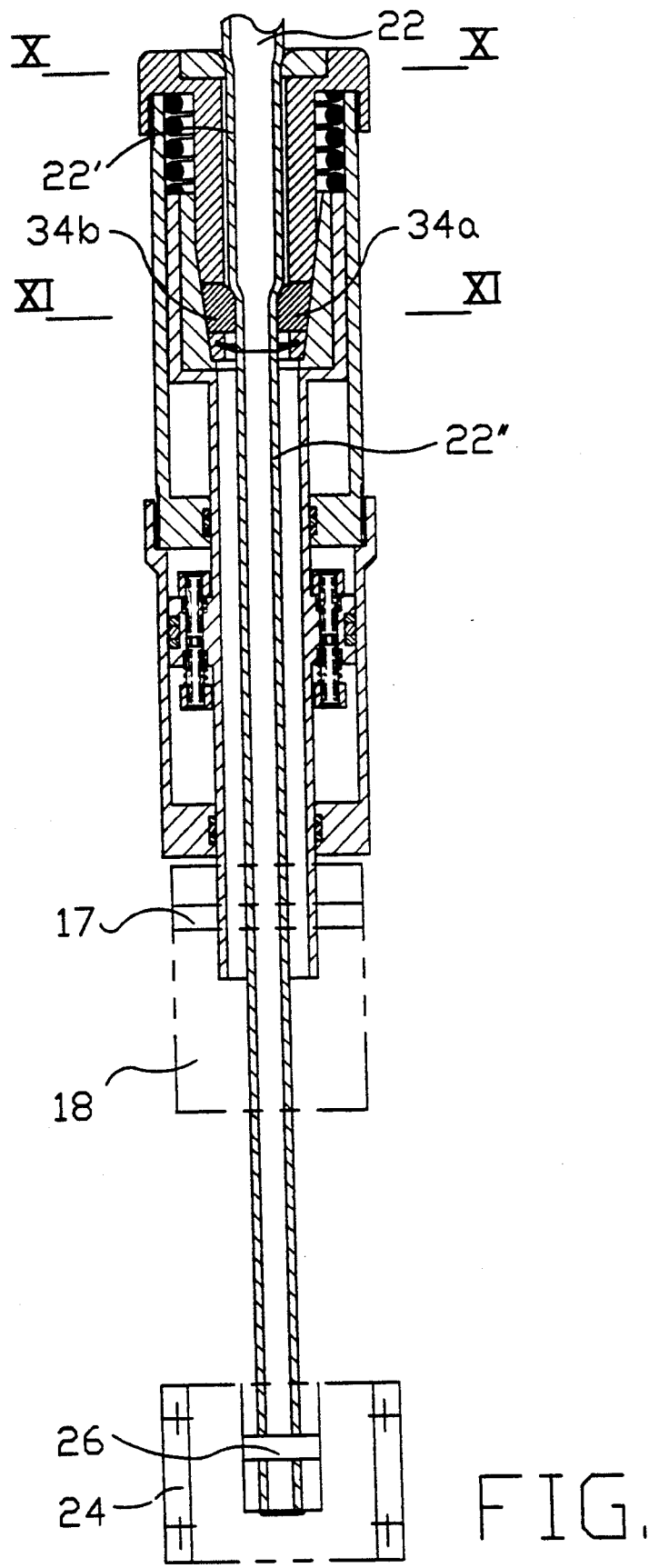
FIG. 9 illustrates the system toward the end of the crash induced position.

Operation of the impact absorbing system will now be briefly described with particular reference to FIGS. 8 and 9. When unoccupied, the position of the system is as shown in FIG. 3, namely spring 40 is in its expanded position, die jaws 34 being at the top of cavity 36 resulting in maximum opening of aperture 35.

Under normal circumstances, absent accelerative forces being applied to the aircraft, plunger element is open such that hydraulic fluid freely flows between chambers 42a and 42b, thereby allowing unrestricted relative movement between sleeve 44 and housing 20. Once the occupant sits on the seat bucket, shoulder 22a exerts a force on cap member 32 which unimpeded by the hydraulic forces in bottom section 20b both pushes down housing 20 relative to sleeve 44 and correspondingly radially pushes die jaws 34 into cavity 36 to close aperture 35. Upon reaching an equlibrium state governed by the weight of the occupant and the strength of spring 40, the size of aperture 35 is determined, thereby setting the impact attenuation capacity of the system as a function of the weight of the seat occupant or occupants. As will be readily understood, this is in preparation of an impact energy absorbing stage that will occur in the event of an aircraft crash. In any event, this equilibrium situation constantly adjusted throughout normal use correspondant to occupant weight without intervention of the hydraulic restriction plunger operation.

As already indicated, a heavy occupant will cause the contraction of spring 40 to nearly its fully constricted state thereby pushing jaws 34 well within cavity 36 to cause almost the full closure of aperture 35 and provide for greater energy absorption capacity. A light-weight occupant will only cause contraction of the spring to a smaller extent. Hence jaws 34 will not be pushed down as far thereby leaving aperture 35 more open to allow easier passage of rod 22 and optimalize energy absorption capacity for the light weight occupant as required.

In the event of severe acceleration or deceleration as experienced in a crash situation prior to impact, i.e. during evasive crash preventing maneuvers, as well as simultaneously with impact, inertia responsive valve member 56 assumes its closed position by moving upwards or downwards relative to plunger 42—see FIG. 7b—thus preventing flow of hydraulic fluid between chambers 42a and 42b. As a result, the relative positions of housing 20 relative to sleeve 44 are frozen for the duration of preimpact acceleration/deceleration as well as during impact. As a result of this freeze, the last equilibrium position of aperture 35 prior to pre-crash acceleration/deceleration is "memorized", fixing the impact absorption capacity of the system as it was in proportion to the weight of the occupant, irrespective of accelerative forces experienced during pre-crash evasive maneuvering.

Figure 10:
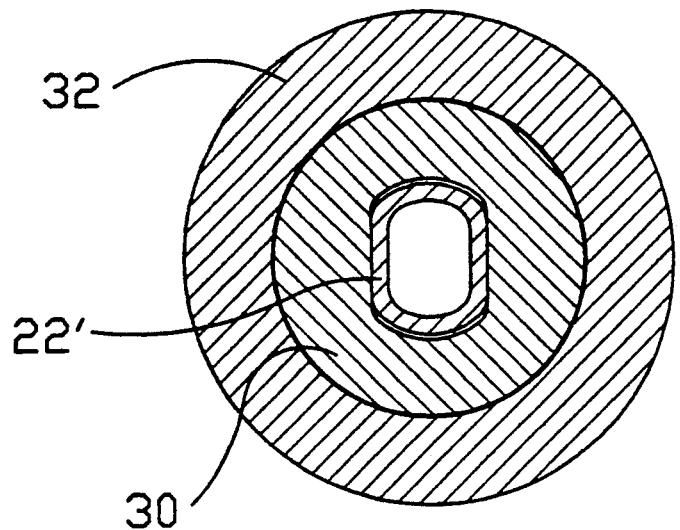
FIG. 10 is a cross-section taken along the line X—X in FIG. 9.
Figure 11:
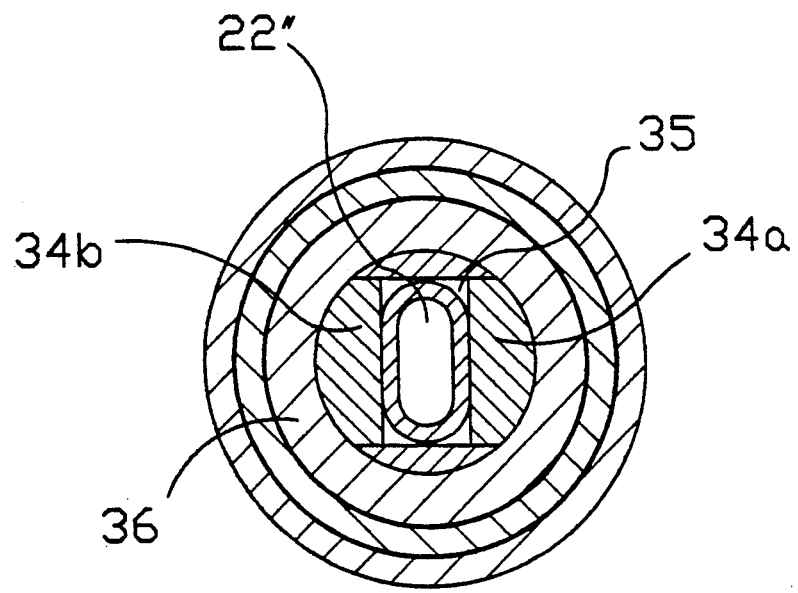
FIG. 11 is a cross-section taken along the line XI—XI in FIG. 9.

Upon impact, inertia induces downward movement of the seat 12 and correspondingly forcibly pulls rod through housing 20. As it is pulled through, rod 22 undergoes a first deformation at die 30 to a shape indicated 22' (FIG. 10) and in addition a further deformation at jaws 34 to the shape indicated 22" (FIG. 11). Thus kinetic impact energy absorption is effected by deformation of rod 22 twice along its length, the amount of deformation and associated impact attenuation capacity having been automatically optimized as a function of the weight of the occupant isolated from accelarative forces experienced during pre-impact evasive maneuvering.

Thus established is a relatively simple and straightforward solution to the problem of individual adjustment and optimalization of the impact attenuation of such systems relative to occupant weight, particularly in the cases where manual adjustment is impractable such as in multi-passenger seats.

Those skilled in the art will readily appreciate that numerous modifications and variations of the embodiment heretofor described may be introduced without departing from the scope of the invention as defined in and by the appended claims.

What is claimed is:

1. An impact energy absorption system for an aircraft seat, comprising mounting means for the seat including at least one substantially upright support to which the seat is coupled for movement therealong between a first, unloaded position and a second, crash-induced position, a deformable rod having a first contoured section and a second contoured section, defining a shoulder, abutting against a deforming die, said second section passing through the die and being coupled to the seat so that said movement of the seat is restrained by and causes deformation of the said first section by said die while the said first section is being pulled therethrough, the system further comprising self-adjusting variable die jaw means surrounding the said second section defining an aperture, the jaw means being moved in the direction of the rod by the weight of an occupant of the seat to automatically close said aperture by an amount proportional to the weight of the occupant of the seat, to thereby cause a further deformation of the said first section by the jaw means while said first section is being pulled through the jaw means towards said second position.

2. The system as claimed in claim 1 wherein the said variable die-jaws are seated within a convergent cavity held in a fixed position relative to the support, the cavity being formed within a housing comprised of telescopically coupled members, a first member of the housing supporting the convergent cavity in the said fixed position, and a second member thereof moveable with respect to the first member and adapted to displace the die-jaws within the said cavity corresponding to the position of the second member relative to the first member, restricting means being provided for blocking relative movement of the said housing members one to the other during periods of external acceleration or deceleration, and allowing moderate relative movement thereof under the weight of the occupant during periods absent said external acceleration or deceleration.

3. The system as claimed in claim 2 wherein the said restricting means comprise a sealed fluid filled hydraulic cylinder associated with the said housing member and post, bisected by a plunger, and valve control means provided to control passage of hydraulic fluid within the cylinder from one side of the plunger to the other.

4. The system as claimed in claim 3 wherein the said valve control means comprise an inertia responsive valve member passed through the plunger, the valve member being normally held in a neutral equilibrium suspended position by the urge of oppositely directed spring means, the valve member being moved away from said equilibrium position in response to external inertial forces resulting from said external acceleration or deceleration, passage means being formed between opposite sides of the plunger, the passage means being sealable by said movement of the valve member away from its suspended equilibrium position in response to said external inertial forces.

5. The system as claimed in claim 4 wherein the valve member is loaded by weight means to increase its mass.

6. The system as claimed in claim 2 wherein spring means are provided for controlling the relative displacement of the first and second housing members relative to each other under the weight of the occupant.

* * * * *